June 5, 1934.  L. S. CHADWICK ET AL  1,961,815
CONDENSER
Filed March 10, 1933  5 Sheets-Sheet 2
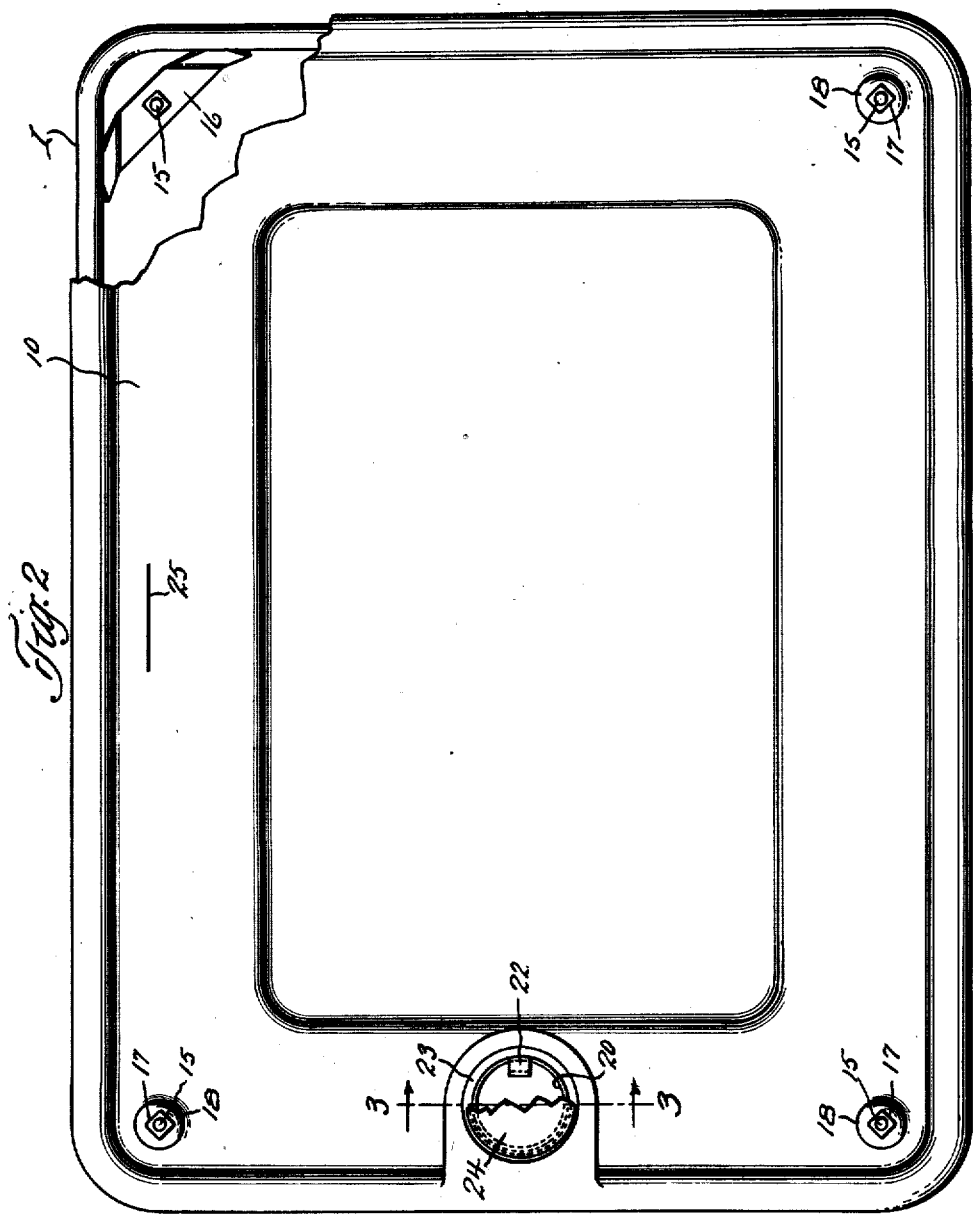
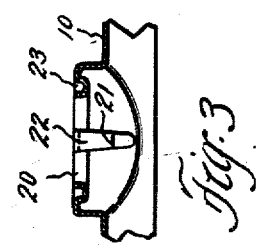
Inventors
Lee S. Chadwick
Marc Resek and
Karl W. Rausch
By Hull, Brock & West
Attorneys

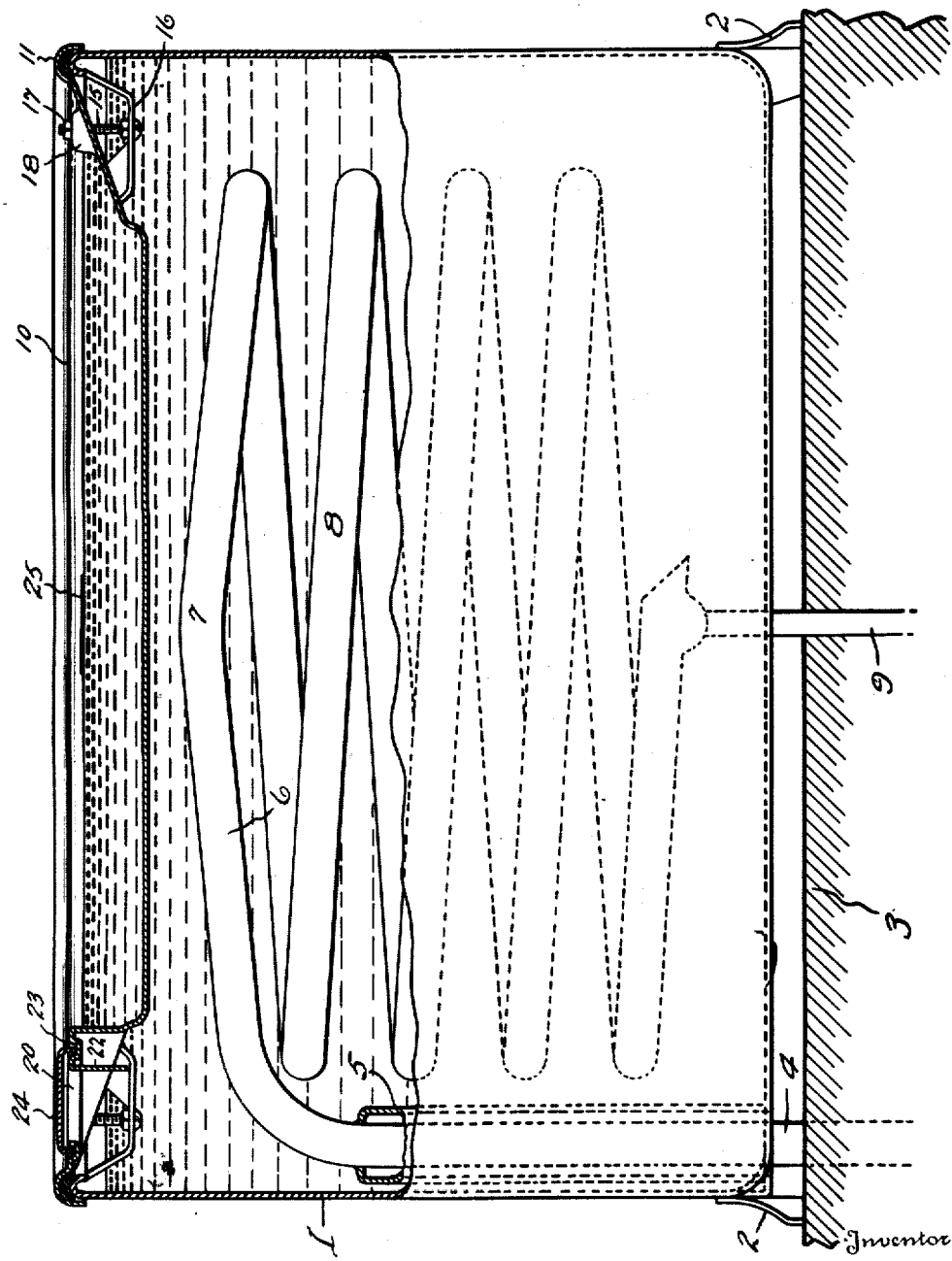

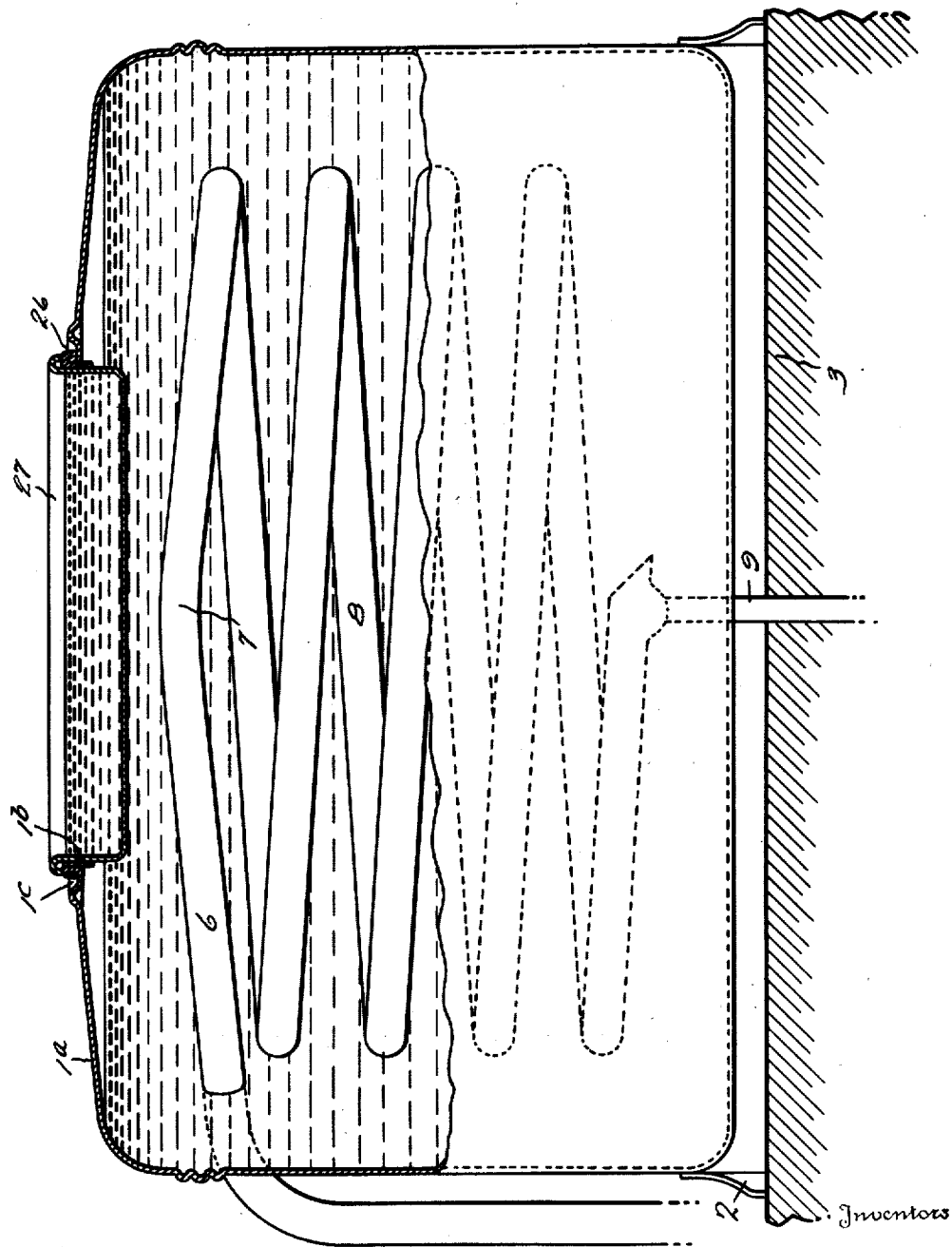

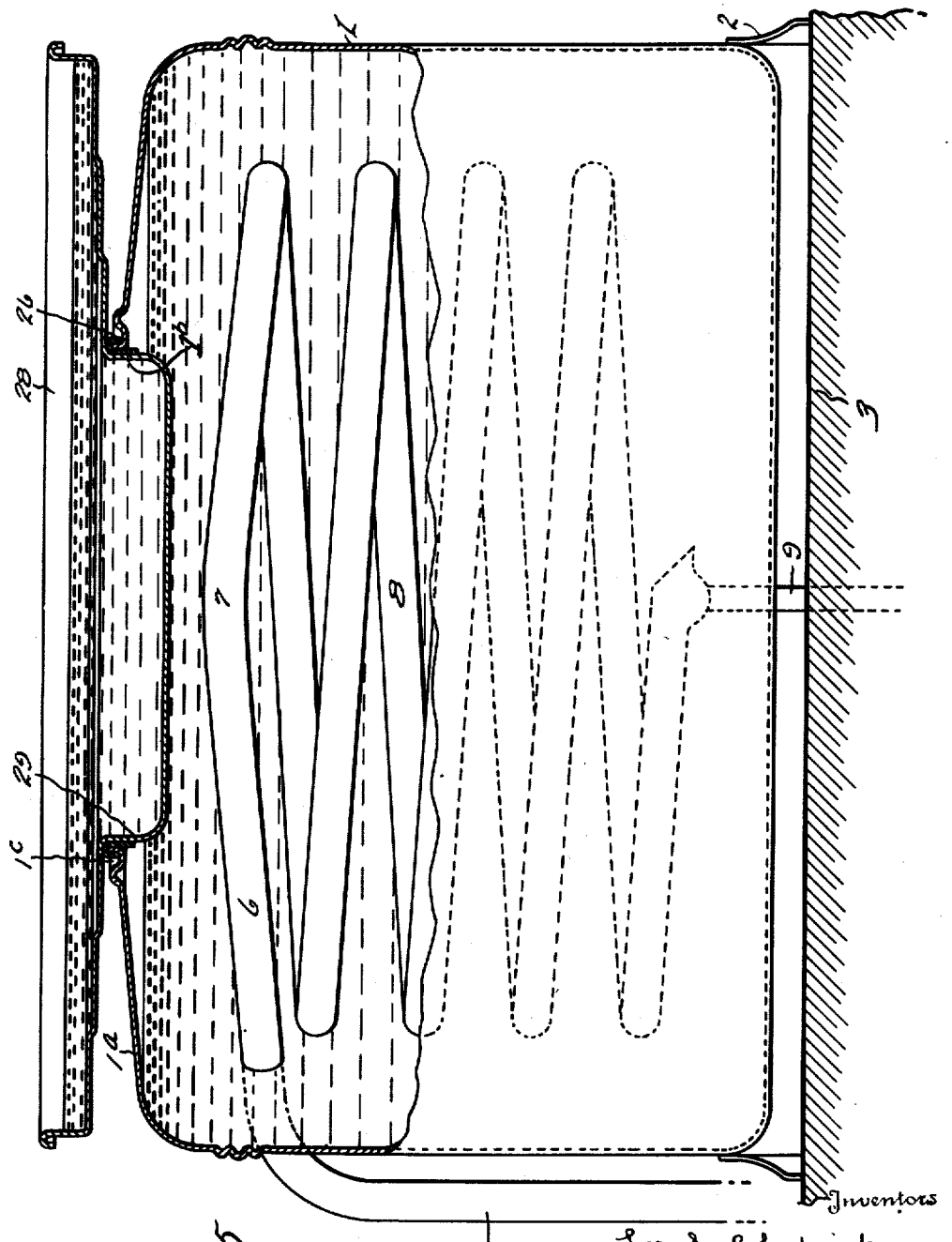

June 5, 1934.  L. S. CHADWICK ET AL  1,961,815
CONDENSER
Filed March 10, 1933  5 Sheets-Sheet 5
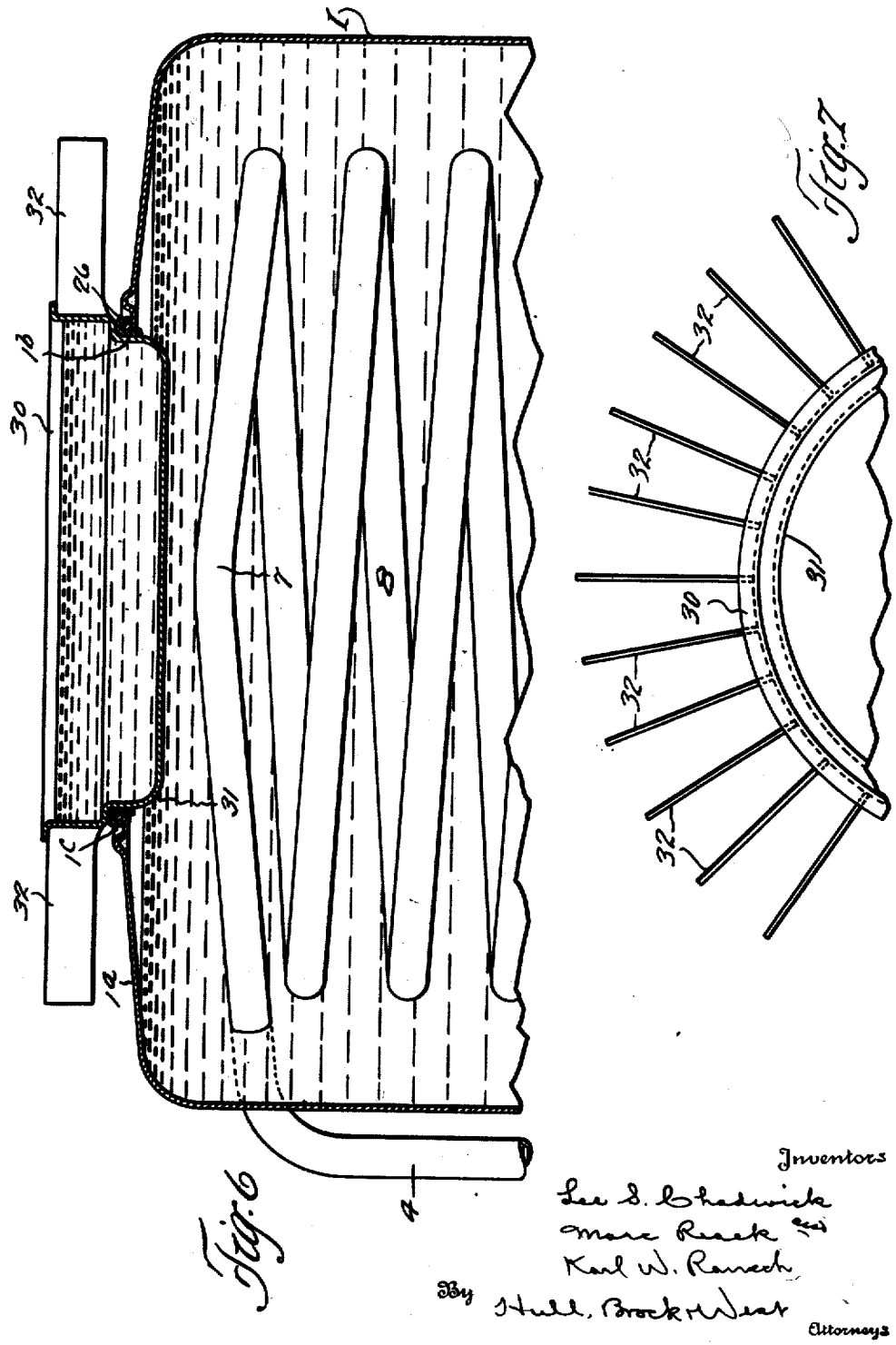
Inventors
Lee S. Chadwick
Marc Resek
Karl W. Rausch
By Hull, Brock & West
Attorneys Patented June 5, 1934

1,961,815

UNITED STATES PATENT OFFICE

1,961,815

CONDENSER

Lee S. Chadwick, Shaker Heights Village, Marc Resek, Cleveland Heights, and Karl W. Rausch, East Cleveland, Ohio, assignors to Perfection Stove Company, Cleveland, Ohio, a corporation of Ohio Application March 10, 1933, Serial No. 660,274

24 Claims. (Cl. 257—24)

This invention relates to an improved condenser that is especially adapted for use in intermittent absorption refrigerating machines or apparatus.

The condenser has always presented rather difficult problems to the producers of refrigerating machines or apparatus of the above mentioned class, principal among which is that of the dissipation or carrying off of heat from the condenser, and this has been particularly acute where such machines or apparatus have been intended for domestic use and the matter of compactness was of some importance and therefore required a condenser tank of relatively small capacity, and more especially where they were for use in very warm climates, or elsewhere under unfavorably high temperature conditions.

The use of an open top condenser tank, wherein evaporation aided cooling, or the plan of circulating water through the condenser tank, while promoting efficiency in a relatively small unit, have proved impracticable in a large measure and quite undesirable in the class of machines in connection with which the invention is especially intended for use for such reasons as the liability of neglect in keeping the open top tank filled; or the lack of a supply of running water for the circulating kind; or, with respect to either, the corroding of the parts subjected to the water, or the necessity of coating such parts with a suitable protective substance to avoid corrosion, or the treating of the water with suitable chemicals to avoid its corrosive action.

A tank tightly sealed to the exclusion of oxygen in order to obviate corrosion and containing a substantially constant quantity of cooling liquid, such as water, has gone far toward eliminating the difficulties above pointed out, but such a tank, excepting under the most favorable circumstances, unless unduly large so as to accommodate considerable cooling liquid, lacks the ability to throw off the heat absorbed during one heating-condensing period before another such period is started.

It is the fundamental purpose of this invention to combine with a tightly closed or hermetically sealed condenser tank an evaporator pan or the like that is open to the atmosphere and in which a quantity of water may be placed which is in intimate heat exchanging relation to the liquid contents of the tank, as by being separated therefrom by a relatively thin wall of heat conducting material, such as metal, so that in the evaporation of the water, heat may be extracted from the liquid within the tank and the temperature of such liquid thus lowered. By reason of this auxiliary cooling feature, the efficiency of the condenser is so increased that a relatively small or compact condenser may be used, the same being thus made especially suitable for employment in domestic refrigerators, and adapting the machines or apparatus for use in very warm climates or under other such unfavorable temperature conditions. In fact, the improved condenser is peculiarly suited to warm dry climates where the rate of evaporation is high, and experience has shown that by virtue of the evaporating feature, the temperature of the contents of the tank is sometimes lowered a matter of degrees below that of the surrounding atmospheric or room temperature, such results being observed at the conclusion of a cycle of operation of the refrigerating apparatus or machine, or, in other words, just prior to the beginning of a heating-condensing period.

Other objects of the invention will appear as this description proceeds, among which may be mentioned the production of a relatively simple, substantial and durable construction and one which enhances the convenience with which the condenser may be filled and attended.

Various embodiments of the invention are illustrated in the accompanying drawings and, with reference thereto, Fig. 1 is a sectional side elevation, and Fig. 2 a plan view, of a rectangular form of condenser in which the entire top of the tank constitutes the evaporating pan; Fig. 3 is a sectional detail on the line 3—3 of Fig. 2; Fig. 4 is a sectional side elevation of a condenser, the tank of which may be cylindrical and in which the closure for the filling opening of the tank constitutes the evaporator pan; Fig. 5 is a similar view of a condenser tank like that shown in Fig. 4 and in which the closure for the filling opening of the tank is constituted of a depending central part of a relatively large evaporating pan that is of substantially the same transverse dimension or diameter as the tank; Fig. 6 is a fragmentary sectional side elevation of another form of the invention in which the tank is similar to those shown in Figs. 4 and 5 but wherein the evaporating pan, the central depressed portion of which constitutes a closure for the filling-opening of the tank, has heat abstracting fins radiating from its peripheral wall, and Fig. 7 is a partial plan view of the evaporating pan of Fig. 6.

A very common and well known form of intermittent absorption refrigerating apparatus or machine includes a generator, with means for intermittently heating the same, and from which a vapor delivery conduit leads to a dehydrator that joins the condensing unit or coil submerged within the cooling liquid of the condenser tank, the condensate flowing therefrom through a suitable conduit directly into a receiver or evaporator. An example of such a machine may be found in Letters Patent No. 1,816,975, dated August 4th, 1931.

In the form of the invention illustrated in Figs. 1, 2 and 3, the condenser tank is designated 1 and is shown as rectangular in form. It is supported by legs 2 upon the top of the refrigerator cabinet that is indicated at 3. The vapor delivery tube 4, that leads from the generator (not shown) extends upwardly through an insulating sleeve 5 and merges into a dehydrator 6 which, in the present instance, is shown as a continuation of the conduit 4, such dehydrator extending gradually upwardly to a point designated 7 where it joins the top of the condensing unit or coil 8 that discharges at its lower end, through a tube 9, into an evaporator or receiver (not shown). The top of the tank is constituted of a relatively shallow evaporating pan 10 whose edge is curved over and downwardly to provide a channel within which is a gasket 11 of suitable packing material that engages the inwardly curled upper edge of the peripheral wall of the tank 1. The pan 10 is removably clamped to the tank by studs 15 that rise from brackets 16 that extend diagonally across the corners of the tank, as best shown in Fig. 2, the studs having nuts 17 applied to their upper ends above bosses 18 of the pan. At one side the pan 10 is provided with a filling opening 20 through which the cooling liquid may be poured into the tank 1, the normal level of which liquid is indicated by a mark 21 on a tongue 22 (see Fig. 3) that depends from one side of the opening 20. Said opening is formed in a raised portion of the inclined side wall of the pan 10 and is surrounded by an annular depression 23 into which the edge of a dished cover 24 rests and in which it may be suitably sealed.

While the pan 4 has been shown as removable from the condenser tank, it may be permanently connected thereto by seaming or welding it to the wall of the tank.

When the apparatus is conditioned for use, the tank 1 is filled to the mark 21, on the tongue 22, with a suitable cooling liquid such as water, and the cover 24 replaced. Water is then poured into the pan 10 to a level indicated by a line 25 (Figs. 1 and 2) on the side thereof. When a cycle of operation of the apparatus is started by applying heat to the generator, as by lighting a liquid fuel or gas burner that is supported in operative relation thereto, the hot vapors ascend through the conduit 4 and pass through the dehydrator 6 into the condensing unit or coil 8 from which the condensate discharges through the tube 9 to the evaporator or receiver. As is well known, the liquid contained within the refrigerating system consists of a mixture of a suitable refrigerant, such as ammonia, and an absorbent therefor, such as water. When they reach the dehydrator 6, the absorbent vapors condense and flow back through the conduit 4 to the generator, while the refrigerant vapors pass on into the condensing unit or coil and are condensed and delivered to the evaporator or receiver.

To prevent the liquid in the lower portion of the tank 1 from becoming heated by the vapors as they rise through the conduit 4, such conduit, for a suitable distance above the bottom of the condenser tank, is insulated by a sleeve 5. The sleeve, at its upper end, is contracted and joined to the conduit 4, and at its lower end is welded to the bottom of the tank about an opening that is substantially equal to the internal diameter of the sleeve so that an air space is provided between the sleeve and the conduit 4. The liquid in the tank 1 is relatively cool at the beginning of a cycle of operation and adjacent the top of the tank its temperature is raised by the heat given off by the vapors as they pass through the dehydrator and the adjacent portion of the condensing unit or coil. By being protected from the heat given off by the vapors throughout the height of the insulating sleeve 5, the lower portion of the body of the cooling liquid remains at a sufficiently low temperature throughout the heating period of the cycle of operation to effect the condensation of the refrigerant vapors, and the rise of temperature of the upper portion of said body of liquid is materially retarded by the cooling effect of the evaporation of the water in the pan 10. After the heat-condensing period is concluded, and during the evaporating period which occupies the remainder of the cycle of operation, the temperature of the cooling liquid in the condenser tank 1 gradually subsides and by the evaporative action of the water in the tank 10, its temperature may be reduced approximately to or somewhat below the surrounding atmospheric temperature by the time the subsequent cycle is initiated by applying heat to the generator.

The modified forms of the invention illustrated in Figs. 4, 5 and 6 will be readily understood from the above description of the form illustrated in Figs. 1 to 3. The same reference characters are used to designate parts common to the several forms, and in Figs. 4, 5 and 6, the condenser tank 1 is shown as having an upwardly inclined top wall 1ª. A filling opening occupies the center of the top 1ª in each of the modifications that are now under consideration and the same is surrounded by an upwardly directed flange 1ᵇ about which is formed an annular depression 1ᶜ. A gasket 26 of rubber or other suitable packing material is fitted within said opening and about the flange 1ᵇ and, in the modification of the invention illustrated in Fig. 4, the same receives with a snug fit the peripheral wall of an evaporator pan 27 that serves as a closure for the condenser tank and has its edge curled over to bear upon the gasket 26. The tank 1 may be filled with cooling liquid to a level above the bottom of the pan 27, as indicated, and water may be placed within said pan to the depth shown.

In Fig. 5 a relatively large evaporator pan 28 has a central depressed portion 29 that fits within and serves as a closure for the filling opening of the condenser tank, the body portion of the pan flaring outwardly to practically the same cross dimension or diameter as that of the tank.

In Figs. 6 and 7 is shown an evaporator pan 30 having a bottom extension 31 that fits within and serves as a closure for the condenser tank opening, and heat abstracting fins 32 radiate from the peripheral wall of the pan. These tend to carry away or dissipate the heat from the metallic walls of the pan and enhance the cooling action of the evaporating water.

Having thus described our invention, what we claim is:

1. A condenser comprising, in combination, a receptacle adapted to contain a cooling medium, a condensing unit within the receptacle, and means for holding an evaporating liquid exposed to the atmosphere and in heat absorbing relation to the cooling medium in the receptacle, such evaporating liquid being separate and distinct from the cooling medium.

2. A condenser comprising, in combination, a tank adapted to contain a cooling medium, a condensing unit enclosed by the tank, and a receptacle adapted to hold a body of evaporating liquid exposed to the atmosphere and in heat absorbing relation to the cooling medium in the tank, such evaporating liquid being separate and distinct from the cooling medium.

3. A condenser comprising, in combination, a tank adapted to contain a cooling medium, a condensing unit enclosed by the tank, and a receptacle adapted to hold a body of evaporating liquid exposed to the atmosphere and separated from the cooling medium in the tank by a wall of heat conducting material.

4. A condenser comprising, in combination, a tank adapted to contain a body of cooling liquid, a condensing unit enclosed by the tank, and a receptacle dipping into said body of cooling liquid and adapted to hold a body of evaporating liquid exposed to the atmosphere.

5. A condenser comprising a closed tank adapted to contain a body of cooling liquid and having its top dished and dipping into said body of liquid, said dished top being adapted to hold a body of evaporating liquid, and a condensing unit enclosed by the tank.

6. A condenser comprising a closed tank adapted to contain a body of cooling liquid, the top of the tank being dished to a depth appreciably below the liquid level in the tank, said dished top serving to hold a body of evaporating liquid exposed to the atmosphere, and a dehydrator and condensing unit enclosed by the tank with the former above the latter and adjacent the dished top of the tank.

7. A condenser comprising, in combination, a tank having an opening and adapted to contain a body of cooling liquid, a condensing unit enclosed by the tank, and a receptacle having a part projecting through said opening into the body of cooling liquid and adapted to hold a body of evaporating liquid exposed to the atmosphere.

8. A condenser comprising, in combination, an open top tank adapted to contain a body of cooling liquid, a condensing unit enclosed by the tank, and an evaporating pan closing the open top of the tank and dripping into the body of cooling liquid and adapted to hold a body of evaporating liquid.

9. A condenser comprising, in combination, an open top tank adapted to contain cooling liquid to a level adjacent the top of the tank, an evaporating pan closing the open top of the tank and sealing the same, the bottom of said pan extending an appreciable distance below the liquid level in the tank, said pan being adapted to contain a body of evaporating liquid to a given level, a portion of said pan being elevated above said level, said portion of the pan having a filling opening for the tank, a closure for said opening, an indicator associated with said filling opening for designating the maximum liquid level in the tank, and a condensing unit enclosed by the tank.

10. A condenser comprising a closed tank having a dished top for containing a body of evaporating liquid to a given level, a portion of said top being elevated above the plane of said level and provided with a filling opening for the tank, the tank being adapted to contain a body of cooling liquid to a level above the bottom of the dished top, a closure for said opening, and a condensing unit enclosed by the tank.

11. A condenser comprising a closed tank having a dished top for containing a body of evaporating liquid, said top being provided with a mark to indicate the maximum liquid level, said dished top having a portion elevated above the plane of said mark and provided with a filling opening for the tank, a liquid level indicator associated with said opening, the tank being adapted to contain a body of cooling liquid to the level designated by said indicator, a closure for said opening, and a condensing unit enclosed by the tank.

12. A condenser comprising, in combination, a tank having an open top, an evaporating pan constituting a closure for the open top of the tank, a gasket of packing material interposed between the periphery of the pan and the rim of the tank, means for drawing the pan downwardly onto the tank to seal the latter, the tank being adapted to contain a body of cooling liquid to a level appreciably above the bottom of the pan and the pan being adapted to contain a body of evaporating liquid to a given level and a condensing unit enclosed by the tank.

13. A condenser comprising, in combination, a tank having an open top, an evaporating pan constituting a closure for the open top of the tank, the periphery of the pan being formed with a downwardly facing channel, a gasket of packing material contained within said channel for engagement with the rim of the tank, means for drawing the pan downwardly onto the tank to seal the latter, the tank being adapted to contain a body of cooling liquid to a level appreciably above the bottom of the pan and the pan being adapted to contain a body of evaporating liquid to a given level, the pan having a portion elevated above said level and provided with a filling opening for the tank, a closure for said opening, and a condensing unit enclosed by the tank.

14. A condenser comprising, in combination, a tank having an open top, an evaporating pan constituting a closure for the open top of the tank, the periphery of the pan being formed with a downwardly facing channel, a gasket of packing material contained within said channel for engagement with the rim of the tank, means for drawing the pan downwardly onto the tank to seal the latter, the pan having a mark for indicating a maximum liquid level therein and being provided with an elevated portion above the plane of said mark, said elevated portion having a filling opening for the tank, an indicator associated with said opening for designating the maximum liquid level in the tank, a closure for said opening, and a condensing unit enclosed by the tank.

15. A condenser comprising a closed tank having a dished top and adapted to contain a body of cooling liquid whose level is an appreciable distance above the bottom of the dished top, said dished top being adapted to contain a body of evaporating liquid, a vapor delivery conduit entering the tank, a condensing unit within the tank and communicatively connected to said conduit, and insulating means shielding the condensing unit from the heat of the vapor delivery conduit.

16. A condenser comprising a closed tank having a dished top and adapted to contain a body of cooling liquid whose level is an appreciable distance above the bottom of the dished top, said dished top being adapted to contain a body of evaporating liquid, a vapor delivery conduit rising through the bottom of the tank, a dehydrator communicatively connected to said conduit and reposing a relatively short distance below the bottom of the depressed top, a condensing unit communicatively connected to the dehydrator and occupying the portion of the tank therebelow, said condensing unit having an outlet adjacent the bottom of the tank, and insulating means surrounding the portion of the vapor delivery conduit that is above the bottom of the tank.

17. A condenser comprising, in combination, a receptacle having therein a cooling medium, a condensing unit within said receptacle, and means containing an evaporating liquid arranged in heat absorbing relation to the cooling medium in the receptacle, such evaporating liquid being separate and distinct from the cooling medium.

18. A condenser comprising, in combination, a tank having an opening in its top and adapted to contain a body of cooling liquid, and an evaporator pan having a portion extending downwardly through and closing said opening and dipping into the liquid in the tank, said pan being adapted to hold a body of evaporating liquid, and a condenser unit enclosed by the tank.

19. A condenser comprising, in combination, a tank having an opening in its top and adapted to contain a body of cooling liquid, said opening being surrounded by an upwardly extending lip that is surrounded by a groove, a gasket of packing material extending through said opening and overlying the lip and projecting into said groove, and an evaporator pan having a portion extending through said opening in engagement with the gasket and a part thereabove overlying and contacting with the gasket, said pan extending below the liquid level in the tank and being adapted to contain a body of evaporating liquid, and a condensing unit enclosed by the tank.

20. A condenser comprising a tank having an opening in its top and adapted to contain a body of cooling liquid, an evaporating pan of relatively large area having a central depending portion adapted to extend through and close the opening in the top of the tank, said portion being of sufficient depth to dip into the body of cooling liquid, the pan being adapted to hold a body of evaporating liquid, and a condensing unit enclosed by the tank.

21. A condenser comprising a tank having an opening in its top and adapted to contain a body of cooling liquid, an evaporating pan of relatively large area having a central depending portion adapted to extend through and close the opening in the top of the tank, said portion being of sufficient depth to dip into the body of cooling liquid, the pan being adapted to hold a body of evaporating liquid, a condensing unit enclosed by the tank, and a gasket sealing the joint between the depending portion of the pan and the surrounding portion of the top of the tank, the gasket extending outwardly and contacting with the part of the pan surrounding its depending portion.

22. A condenser comprising, in combination, a tank having an opening at its top and adapted to contain a body of cooling liquid, an evaporating pan closing said opening and dipping into the body of cooling liquid, said pan being adapted to hold a body of evaporating liquid and being equipped with heat abstracting fins.

23. A condenser comprising, in combination, a tank having an opening at its top and adapted to contain a body of cooling liquid, an evaporating pan having a depressed bottom inset from its peripheral wall, the depressed bottom being adapted to extend through and close the opening in the top of the tank and dip into the body of cooling liquid, said pan being adapted to hold a body of evaporating liquid, heat abstracting fins projecting from the peripheral wall of the pan, and a condensing unit enclosed by the tank.

24. A condenser comprising, in combination, a tank having an opening in its top wall, a condensing unit enclosed by the tank, an evaporating pan whose bottom portion extends through said opening and serves as a closure for the same, the tank being adapted to contain cooling liquid to a level above the bottom of the evaporating pan and the evaporating pan being adapted to hold a quantity of evaporating liquid, and heat abstracting fins projecting from the peripheral wall of the evaporating pan above the top of the tank.

LEE S. CHADWICK.
MARC RESEK.
KARL W. RAUSCH.

CERTIFICATE OF CORRECTION.

Patent No. 1,961,815.   June 5, 1934.

LEE S. CHADWICK, ET AL.

It is hereby certified that error appears in the printed specification of the above numbered patent requiring correction as follows: Page 3, line 55, claim 8, for "dripping" read dipping; and that the said Letters Patent should be read with this correction therein that the same may conform to the record of the case in the Patent Office.

Signed and sealed this 11th day of September, A. D. 1934.

Leslie Frazer (Seal)   Acting Commissioner of Patents.

tance above the bottom of the dished top, said dished top being adapted to contain a body of evaporating liquid, a vapor delivery conduit rising through the bottom of the tank, a dehydrator communicatively connected to said conduit and reposing a relatively short distance below the bottom of the depressed top, a condensing unit communicatively connected to the dehydrator and occupying the portion of the tank therebelow, said condensing unit having an outlet adjacent the bottom of the tank, and insulating means surrounding the portion of the vapor delivery conduit that is above the bottom of the tank.

17. A condenser comprising, in combination, a receptacle having therein a cooling medium, a condensing unit within said receptacle, and means containing an evaporating liquid arranged in heat absorbing relation to the cooling medium in the receptacle, such evaporating liquid being separate and distinct from the cooling medium.

18. A condenser comprising, in combination, a tank having an opening in its top and adapted to contain a body of cooling liquid, and an evaporator pan having a portion extending downwardly through and closing said opening and dipping into the liquid in the tank, said pan being adapted to hold a body of evaporating liquid, and a condenser unit enclosed by the tank.

19. A condenser comprising, in combination, a tank having an opening in its top and adapted to contain a body of cooling liquid, said opening being surrounded by an upwardly extending lip that is surrounded by a groove, a gasket of packing material extending through said opening and overlying the lip and projecting into said groove, and an evaporator pan having a portion extending through said opening in engagement with the gasket and a part thereabove overlying and contacting with the gasket, said pan extending below the liquid level in the tank and being adapted to contain a body of evaporating liquid, and a condensing unit enclosed by the tank.

20. A condenser comprising a tank having an opening in its top and adapted to contain a body of cooling liquid, an evaporating pan of relatively large area having a central depending portion adapted to extend through and close the opening in the top of the tank, said portion being of sufficient depth to dip into the body of cooling liquid, the pan being adapted to hold a body of evaporating liquid, and a condensing unit enclosed by the tank.

21. A condenser comprising a tank having an opening in its top and adapted to contain a body of cooling liquid, an evaporating pan of relatively large area having a central depending portion adapted to extend through and close the opening in the top of the tank, said portion being of sufficient depth to dip into the body of cooling liquid, the pan being adapted to hold a body of evaporating liquid, a condensing unit enclosed by the tank, and a gasket sealing the joint between the depending portion of the pan and the surrounding portion of the top of the tank, the gasket extending outwardly and contacting with the part of the pan surrounding its depending portion.

22. A condenser comprising, in combination, a tank having an opening at its top and adapted to contain a body of cooling liquid, an evaporating pan closing said opening and dipping into the body of cooling liquid, said pan being adapted to hold a body of evaporating liquid and being equipped with heat abstracting fins.

23. A condenser comprising, in combination, a tank having an opening at its top and adapted to contain a body of cooling liquid, an evaporating pan having a depressed bottom inset from its peripheral wall, the depressed bottom being adapted to extend through and close the opening in the top of the tank and dip into the body of cooling liquid, said pan being adapted to hold a body of evaporating liquid, heat abstracting fins projecting from the peripheral wall of the pan, and a condensing unit enclosed by the tank.

24. A condenser comprising, in combination, a tank having an opening in its top wall, a condensing unit enclosed by the tank, an evaporating pan whose bottom portion extends through said opening and serves as a closure for the same, the tank being adapted to contain cooling liquid to a level above the bottom of the evaporating pan and the evaporating pan being adapted to hold a quantity of evaporating liquid, and heat abstracting fins projecting from the peripheral wall of the evaporating pan above the top of the tank.

LEE S. CHADWICK.
MARC RESEK.
KARL W. RAUSCH.

CERTIFICATE OF CORRECTION.

Patent No. 1,961,815.                 June 5, 1934.

LEE S. CHADWICK, ET AL.

It is hereby certified that error appears in the printed specification of the above numbered patent requiring correction as follows: Page 3, line 55, claim 8, for "dripping" read dipping; and that the said Letters Patent should be read with this correction therein that the same may conform to the record of the case in the Patent Office.

Signed and sealed this 11th day of September, A. D. 1934.

Leslie Frazer (Seal)                           Acting Commissioner of Patents.